(12) United States Patent
Francis et al.

(10) Patent No.: US 9,840,060 B2
(45) Date of Patent: Dec. 12, 2017

(54) RIGID SLIT-TUBE LAMINATE SYSTEM

(71) Applicant: Roccor, LLC, Louisville, CO (US)

(72) Inventors: William H. Francis, Boulder, CO (US); Gregg E. Freebury, Louisville, CO (US); Michael J. Hulse, Erie, CO (US)

(73) Assignee: TENDEG LLC, Louisville, CO (US)

( * ) Notice: Subject to any disclaimer, the term of this patent is extended or adjusted under 35 U.S.C. 154(b) by 247 days.

(21) Appl. No.: 14/646,002

(22) PCT Filed: Nov. 21, 2013

(86) PCT No.: PCT/US2013/071266
§ 371 (c)(1),
(2) Date: May 19, 2015

(87) PCT Pub. No.: WO2014/081943
PCT Pub. Date: May 30, 2014

(65) Prior Publication Data
US 2016/0052225 A1 Feb. 25, 2016

Related U.S. Application Data

(60) Provisional application No. 61/729,129, filed on Nov. 21, 2012.

(51) Int. Cl.
*F16L 55/00* (2006.01)
*B32B 3/26* (2006.01)
(Continued)

(52) U.S. Cl.
CPC .............. *B32B 3/266* (2013.01); *B29C 61/00* (2013.01); *B29C 67/0014* (2013.01); *B32B 1/08* (2013.01);
(Continued)

(58) Field of Classification Search
USPC .................................. 138/108, 110, 128, 162
See application file for complete search history.

(56) References Cited

U.S. PATENT DOCUMENTS 2,325,616 A * 7/1943 Landweber .............. B63G 8/42
114/221 R
3,144,104 A 8/1964 Weir et al.
(Continued)

FOREIGN PATENT DOCUMENTS

| WO | WO 00/64663 | 11/2000 |
| WO | WO 02/06619 | 1/2002 |
| WO | 2014/127292 | 8/2014 |

OTHER PUBLICATIONS

International Search Report and Written Opinion for PCT International Patent Application No. PCT/US2014/016605, dated Jun. 3, 2014, 13 pages total.
(Continued)

*Primary Examiner* — James Hook
(74) *Attorney, Agent, or Firm* — Craig R. Miles; CR Miles P.C.

(57) ABSTRACT

Laminate structures and methods of making laminate structures having overwrapped laminate edges which resist delamination and fraying or including one or more stabilizer laminates which afford greater radial and torsional rigidity in longitudinally slit tube structures.

8 Claims, 9 Drawing Sheets

(51) Int. Cl.
*B32B 3/02* (2006.01)
*B29C 67/00* (2017.01)
*B29C 61/00* (2006.01)
*B32B 5/26* (2006.01)
*B32B 1/08* (2006.01)
*B32B 3/04* (2006.01)
*B32B 7/12* (2006.01)
*F16L 11/04* (2006.01)
*B32B 37/14* (2006.01)

(52) U.S. Cl.
CPC .............. *B32B 3/02* (2013.01); *B32B 3/04* (2013.01); *B32B 5/26* (2013.01); *B32B 7/12* (2013.01); *F16L 11/042* (2013.01); *B32B 37/142* (2013.01); *B32B 2260/021* (2013.01); *B32B 2260/046* (2013.01); *B32B 2597/00* (2013.01)

(56) References Cited

U.S. PATENT DOCUMENTS

| | | | |
|---|---|---|---|
| 3,144,215 A | 8/1964 | Klein | |
| 3,208,478 A * | 9/1965 | Baines | E02B 11/005 138/162 |
| 3,213,573 A | 10/1965 | Bohr et al. | |
| 3,300,910 A * | 1/1967 | Isaac | B64C 27/50 137/355.26 |
| 3,360,894 A | 1/1968 | Orr et al. | |
| 3,361,377 A | 1/1968 | Trexler | |
| 3,385,397 A | 5/1968 | Robinsky | |
| 3,434,674 A | 3/1969 | Groskopfs | |
| 3,503,164 A * | 3/1970 | Berry | E04C 3/005 52/108 |
| 3,528,543 A | 9/1970 | Robinsky | |
| 3,564,789 A | 2/1971 | Vyvyan et al. | |
| 3,589,632 A | 6/1971 | Rew | |
| 3,608,844 A | 9/1971 | Tumulty et al. | |
| 3,696,568 A | 10/1972 | Berry | |
| 3,784,441 A | 1/1974 | Kaempen | |
| 3,811,633 A | 5/1974 | Cummings et al. | |
| 3,862,528 A | 1/1975 | Meissinger | |
| 4,047,339 A | 9/1977 | Smith et al. | |
| 4,519,434 A * | 5/1985 | Forquer | E06B 9/171 138/115 |
| 4,543,998 A * | 10/1985 | Thomerson | E21B 17/1035 138/110 |
| 4,723,349 A * | 2/1988 | Grimes | H01F 27/266 138/162 |
| 4,796,797 A | 1/1989 | Nakako et al. | |
| 4,991,784 A | 2/1991 | Schmid | |
| 5,088,014 A | 2/1992 | Boughey | |
| 5,235,788 A | 8/1993 | Maimets | |
| 5,348,096 A | 9/1994 | Williams | |
| 5,474,123 A * | 12/1995 | Buckshaw | F28F 19/002 138/110 |
| 5,882,322 A | 3/1999 | Kim et al. | |
| 6,065,540 A | 5/2000 | Thomeer et al. | |
| 6,131,431 A | 10/2000 | Ona | |
| 6,217,975 B1 | 4/2001 | Daton-Lovett | |
| 6,256,938 B1 | 7/2001 | Daton-Lovett | |
| 6,454,493 B1 | 9/2002 | Lohbeck | |
| 6,602,574 B1 | 8/2003 | Daton-Lovett | |
| 6,920,722 B2 | 6/2005 | Brown et al. | |
| 7,251,323 B2 | 7/2007 | Holtorf et al. | |
| 7,694,465 B2 | 4/2010 | Pryor | |
| 7,806,370 B2 | 10/2010 | Beidleman et al. | |
| 7,895,795 B1 | 3/2011 | Murphey et al. | |
| 8,061,660 B2 | 11/2011 | Beidleman et al. | |
| 8,893,442 B1 | 11/2014 | Spence et al. | |
| 2002/0170612 A1 * | 11/2002 | Penza | F16L 7/00 138/108 |
| 2005/0011569 A1 * | 1/2005 | Della Putta | F01N 13/14 138/110 |
| 2007/0006963 A1 | 1/2007 | Bever | |
| 2007/0181241 A1 | 8/2007 | Kramer et al. | |
| 2008/0078139 A1 | 4/2008 | Overby | |
| 2011/0195209 A1 | 8/2011 | Bosman et al. | |
| 2011/0204186 A1 | 8/2011 | Keller et al. | |
| 2011/0308174 A1 | 12/2011 | Meyer | |
| 2012/0297717 A1 | 11/2012 | Keller et al. | |
| 2013/0061541 A1 | 3/2013 | Taylor et al. | |

OTHER PUBLICATIONS

Astro Aerospace Corporation. Stem Design & Performance. Website, http://www.as.northropgrumman.com, originally downloaded Oct. 24, 2012, 9 total pages.
Galletly et al. Bistable composite slit tubes. I. A beam model. International Journal of Solids and Structures, 2004, 41:4517-4533.
Iqbal et al. Bi-Stable Composite Shells. American Institute for Aeronautics and Astronautics, 41st Structures, Structural Dynamics, and Materials Conference and Exhibit, Apr. 2000, Atlanta, GA, USA, 8 total pages.
Northrop Grumman. Astro Aerospace: Deployable Structures and Mechanisms for Space Applications. Website, http://www.as.northropgrumman.com, originally downloaded Jun. 12, 2015, 4 total pages.
Northrop Grumman. 150-lb Linear Actuator Stem. Website, http://www.as.northropgrumman.com, originally downloaded Oct. 24, 2012, 2 total pages.
Prigent. A Finite Element Model of Bi-Stable Woven Composite Tape-Springs. KTH, Thesis submitted for the Master's degree, Oct. 2011, Stockholm, Sweden.
Rolatube Extending Technology. Rolatube Technology: Product Brochure: Defense and Security. Website, http://www.rolatube.com, originally downloaded Oct. 24, 2012, 20 total pages.
Rolatube Extending Technology. Website, http://www.rolatube.com, originally downloaded Jun. 12, 2015, 2 total pages.
Rolatube Technology Ltd. A Brief Introduction to Bi-Stable Reeled Composites. Website, http://www.rolatube.com, originally downloaded Oct. 24, 2012, 9 total pages.
Straubel, Hillebrandt and Belvin. Results of Research Study: Evaluation of Deployable Space Mast Concepts. Final Presentation, NASA—LaRC, dated Sep. 28, 2011, 54 total pages.
U.S. Appl. No. 61/729,129, filed Nov. 21, 2012.
PCT Interantional Patent Application No. PCT/US2013/071266, filed Nov. 21, 2013.
International Search Report and Written Opinion for PCT Interantional Patent Application No. PCT/US2013/071266, dated May 12, 2014, 12 pages total.
Straubel. Large Deployable Structures. Gossamer Concepts for Versatile Applications. SpacePlan 2020; University of Surrey, Feb. 27, 2014, Guildford, UK; 12 pages total.

* cited by examiner

RIGID SLIT-TUBE LAMINATE SYSTEM

This application is the United States National Stage of International Patent Cooperation Treaty Patent Application No. PCT/US2013/071266, filed Nov. 21, 2013, which claims the benefit of U.S. Provisional Patent Application No. 61/729,129, filed Nov. 21, 2012, each hereby incorporated by reference herein.

I. TECHNICAL FIELD

Laminate structures and methods of making laminate structures having overwrapped laminate edges which resist delamination and fraying or including one or more stabilizer laminates which afford greater radial and torsional rigidity in longitudinally slit tube structures.

II. BACKGROUND

Laminates can be constructed by uniting two or more layers of material together. The process of creating a laminate conventionally refers to impregnating or applying an adherent material in or between layers of laminable material and treating the stack of laminable material to sufficient heat or pressure to join the layers of laminable material. The resulting laminate can take a wide and numerous variety of configurations including three dimensional forms which for example can have one fixed configuration, or can be configurable between two different configurations in which one of the two configurations is stable ("uni-stable configuration"), or configurable between two different configurations in which both configurations can be stable configurations ("bi-stable"). As an illustrative example, a uni-stable configuration may be disposed in substantially flat condition which can be then be disposed as a roll or coil. Upon extension of the laminate from the roll or coil, the laminate may transition toward and assume a stable tubular configuration with the edges disposed in opposed relation (whether adjacent or a distance apart) to define a slit along the longitudinal axis of the tube (also referred to herein as a "longitudinally slit tube").

The laminable material may include one or more of a wide variety of discrete or woven fibers. As illustrative examples, the fibers can include: boron carbide fibers, silicon carbide fibers, alumina fibers, alumina titanium fibers, carbon fibers, para-aramid fibers such as KEVLAR®, polypropylene such as INNEGRA®, a ultra-high molecular weight polyethylene such as DYNEEMA® or SPECTRA®, s-glass, e-glass, polyester, or the like, or combinations thereof. The laminable material can be coated or impregnated with an amount of adherent having mechanical characteristics compatible with altering configuration of the laminate between the substantially flat condition and the longitudinally slit tube. As illustrative examples, the adherent can include: a phenolic, an epoxy, a polyethylene a terephtalate, a vinylester, bis(maleimide/diallybisphenol A, a cyanate ester, a nylon, a polypropylene, polyethylene terephthalate, polyester, polyaryletherketone (such as PEEK®), acrylonitrile butadiene styrene, a polyamide, a polyethylene, a thermoplastic urethane, or the like, or combinations thereof, which can be either catalytically or thermally set.

Because the resulting laminate includes discrete or woven fibers, the fibers may to a lesser or greater extent be exposed, become exposed or fray at one or more of the laminate edges. This may be exacerbated in longitudinally slit tubes which may be disposed between a first configuration and a second configuration or which may be rolled and unrolled to retractably extend a deployable laminate structure. In certain instances, the fibers disengaged from the laminate can extend outward or detach from the laminate to entangle in or damage the deployment device from which the deployable laminate structure retractably stows.

Additionally, because longitudinally slit tubes often deploy from a first condition in the form of flat laminate extended from a roll or coil to assume a second condition in the form of a longitudinally slit tube, the tubular form may not have adequate resistance to deflection along the longitudinal axis under load, or may not have adequate resistance to radial surface deflection upon application of radial forces, or may not have adequate resistance to torsional deflection of the tubular form due applied torque or twisting about the central longitudinal axis of the tubular form.

III. DISCLOSURE OF INVENTION

Accordingly, a broad object of the invention can be to provide a laminate structure and a method of making the laminate structure which avoids or reduces fraying or detachment of fibers at the laminate edges.

Another broad object of the invention can be to provide a laminate structure and a method of making a laminate structure which in the form of a longitudinally slit tube has, as compared to conventional laminate structures, one or more of reduced deflection along the longitudinal axis under load, reduced radial surface deflection under radial load (increased buckling resistance) or reduced torsional deflection about the central longitudinal axis.

Naturally, further objects of the invention are disclosed throughout other areas of the specification, drawings, photographs, and claims.

V. MODE(S) FOR CARRYING OUT THE INVENTION

Now referring primarily to FIGS. 1A through 1C and 2A through 2C, particular embodiments of an inventive laminate structure (1) are shown which avoid or reduce fraying or detachment of one or more fibers (2) from a first laminate edge (3) or a second laminate edge (4) or other edge of a laminate (5).

Figure 1A:
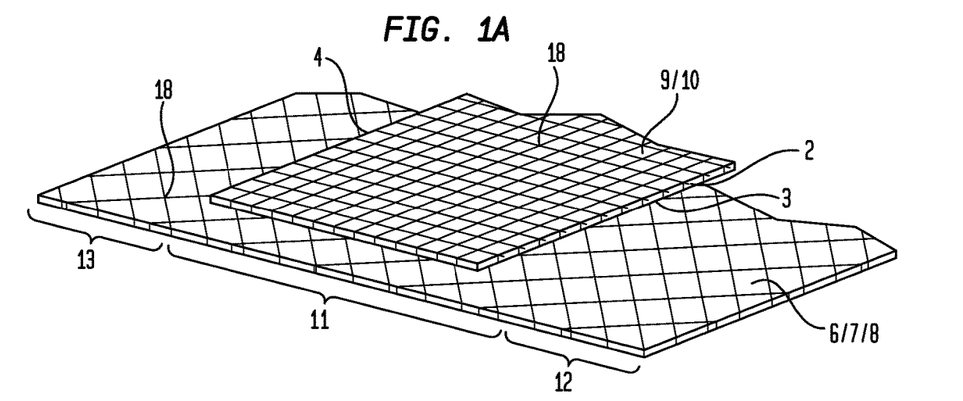
FIGS. 1A-1C illustrate a method of making a particular embodiment of the inventive laminate having overwrapped laminate edges.
Figure 1B:
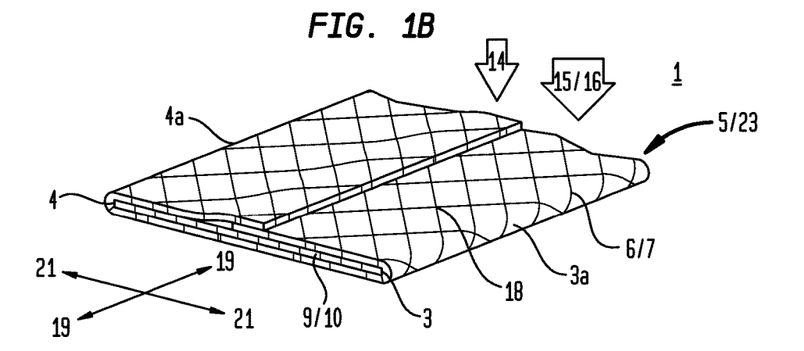
Figure 1C:
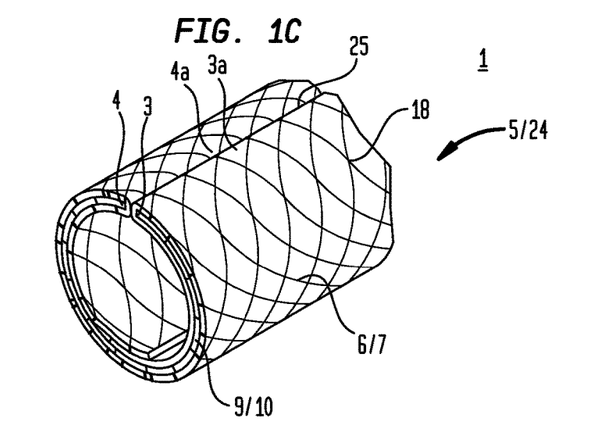

With respect to the illustrative embodiment shown in FIGS. 1A through 1C, a first laminable material (6) having one or more layers (7), as above described, can be disposed in a substantially flat unfolded condition (8) (as shown in the example of FIG. 1A). A second laminable material (9) having one or more layers (10) can be engaged to a medial portion (11) of the first laminable material (6) disposed in the flat unfolded condition (8) defining remaining first and second end portions (12)(13) of said first laminable material (6).

The first end portion (12) of the first laminable material (6) can be folded proximate the first laminate edge (3) of the second laminable material (9) and disposed in overlaying engagement on the second laminable material (9) to overwrap the first laminate edge (3). The second end portion (13) of the first laminable material (6) can be folded proximate a second laminate edge (4) of the second laminable material (6) and disposed in overlaying engagement on the second laminable material (9) to overwrap the second laminate edge (4) (as shown in the example of FIG. 1B).

The second laminable material (9) overwrapped by the first laminable material (6) can be impregnated with an amount of adherent material (14), as described above, or the amount of adherent material (14) can be applied to the second laminable material (9) overwrapped by the first laminable material (6)(as shown in the example of FIG. 1B).

Sufficient heat (15) or pressure (16), or both heat (15) and pressure (16), can be applied to the first and second laminable materials (6)(9) and the adherent material (14) to achieve a laminate (5) having a first overwrapped laminate edge (3a) and second overwrapped laminate edge (4a) (as shown in the example of FIG. 1B). Heat (15) can be applied in a range of between about 10 degrees centigrade ("° C.") and about 400° C. and pressure (16) can be applied in a range of between about 15 pounds per square inch ("psi") and about 50,000 psi depending upon the composition, number, thickness, size, porosity, or other factors as to the first and second laminable materials (6)(9); the source of pressure (16) (whether vacuum pressure, atmospheric pressure, mold pressure, or the like); the source of heat (15) whether directly applied through a mold, or indirectly from a remote heat source, or other factors affecting the lamination process for the achieving the laminate (5) having first and second overwrapped laminate edges (3a)(4a).

As to particular embodiments, the laminate (5) can have a structure which acts to bias configuration of the laminate (5) toward the configuration of a longitudinally slit tube (24) which can, but not necessarily, include the first overwrapped laminate edge (3a) disposed in opposed adjacent relation (whether in contact or a distance apart) to the second overwrapped laminate edge (4a). As one illustrative example, the first laminable material (6) or the second laminable material (9), or both, can, but not necessarily include, a plurality of crossed fibers (18) which act to bias the laminate (5) from a substantially flat condition (23) toward the configuration of a longitudinally slit tube (24) which can, but not necessarily include, the first overwrapped laminate edge (3a) disposed in opposed adjacent relation (whether in contact or a distance apart) to the second overwrapped laminate edge (4a). The plurality of crossed fibers (18) in or parallel to the plane of the laminate (5) can be disposed at an angle between about 0 degrees and about 90 degrees to a first laminate axis (19), such that the laminate (5) can be established in a substantially flat condition (23)(also referred to as the "flat sheet")(which as to particular embodiments can be a non-stable condition or as to other embodiments a stable condition) having first and second overwrapped laminate edges (3a)(4a)(as shown in the example of FIG. 1B).

As to particular embodiments of the laminate (5), the substantially flat condition (23) of the laminate (5) in the non-stable condition can be established in a stable roll or coil that does not spontaneously unroll, uncoil, or unfurl. Upon extension of the laminate (5) from the stable roll or coil, the structure of the laminate (5) can bias toward forming a longitudinally slit tube (24) which can, but not necessarily include, the first overwrapped laminate edge (3a) disposed in opposed adjacent relation to said second overwrapped laminate edge (4a) (as shown in the example of FIG. 1C).

Figure 2A:
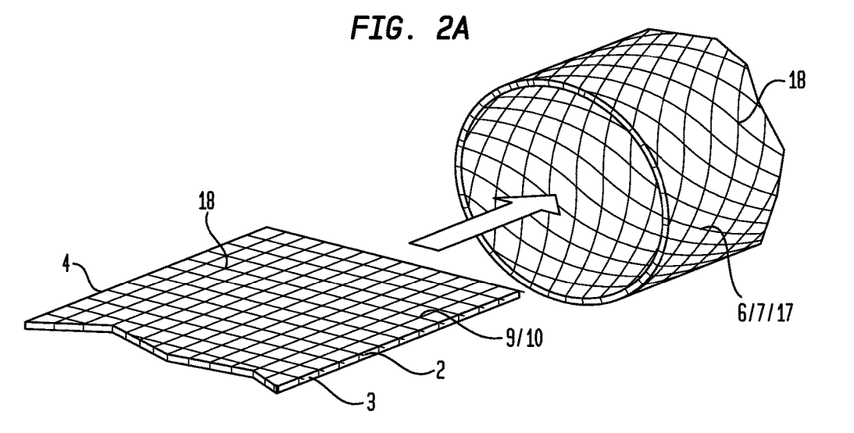
FIGS. 2A-2C illustrate a method of making another particular embodiment of the inventive laminate having overwrapped laminate edges.
Figure 2B:
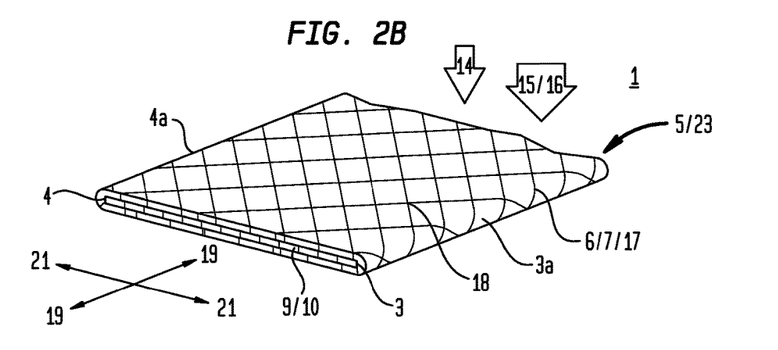
Figure 2C:
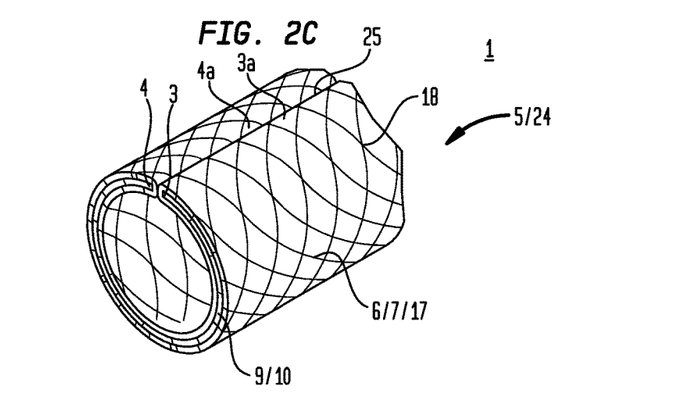

Now referring primarily to FIGS. 2A through 2C, another particular embodiment of the inventive laminate structure (1) is shown which avoids or reduces fraying or detachment of one or more fibers (2) from a first laminate edge (3) and a second laminate edge (4)(or other laminate edge) of a laminate (5). With respect to the illustrative embodiment shown in FIGS. 2A through 2C, a first laminable material (6) having one or more layers (7), as above described, can be disposed in the form of a tube (17) (as shown in the example of FIG. 2A). A second laminable material (9) having one or more layers (10) can be insertingly engaged within the tube (17).

The combination of the second laminable material (9) overwrapped by the first laminable material (6) can be impregnated with an amount of adherent material (14), as described above, or the adherent material (14) can be applied to the second laminable material (9) overwrapped by the first laminable material (6), as above described.

Sufficient heat (15) and pressure (16), as above described, can be applied to the laminable materials (6)(9) and the adherent material (14) to produce a laminate (5) having a first overwrapped laminate edge (3a) and second overwrapped laminate edge (4a) (as shown in the example of FIG. 2B). Again, as to particular embodiments, the first laminable material (6) or the second laminable material (9), or both, can provide a structure which can be established in the flat condition (23) (as shown in the example of FIG. 2B) or can be established in a stable roll or coil, as above described. Similarly, as the laminate (5) extends from the roll or coil, the structure of the laminate (5) can bias formation of a longitudinally slit tube (24) which can, but not necessarily include, first and second overwrapped laminate edges (3a)(4a). The first and second overwrapped laminate edges (3a)(4a) disposed in opposed relation (whether adjacent of or a distance apart) define the longitudinal slit (25)(as shown in the example of FIG. 2C).

Now referring primarily to FIGS. 3A through 3D, particular embodiments of the inventive laminate structure (1) can include a laminate (30) and one or more stabilizers (29). The laminate (30) can have one or more laminated layers (7), produced as above described, which can be disposed in the flat condition (23)(as shown in the example of FIG. 4A). The laminate (30) can have a first laminate edge (3)(or first overwrapped laminate edge (3a) and a second laminate edge (4)(or second overwrapped laminate edge (4a). The laminate (30) can have a structure, as above described, which can act to bias configuration of the laminate (30) from a substantially flat condition (23) toward a longitudinally slit tube (24) having the first laminate edge (3) disposed in opposed relation to said second laminate edge (4) defining a longitudinal slit (25). As to particular embodiments, the laminate (30) can further include a first plurality of crossed fibers (18a) which as above described can act to bias configuration of the laminate (30) from the substantially flat condition (23) toward a longitudinally slit tube (24).

Figure 3A:
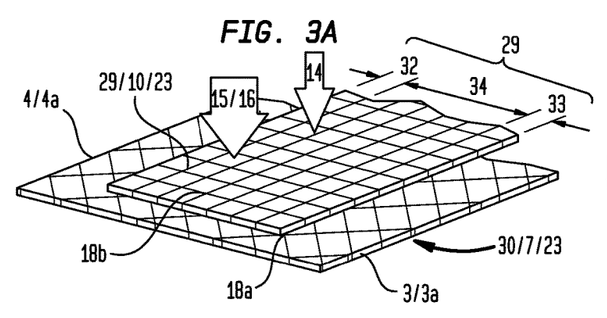
FIGS. 3A-3D illustrate a method of making another particular embodiment of the inventive laminate having one or more laminate structure stabilizers.
Figure 3B:
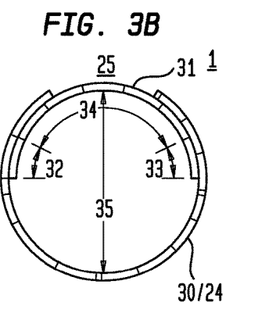
Figure 3C:
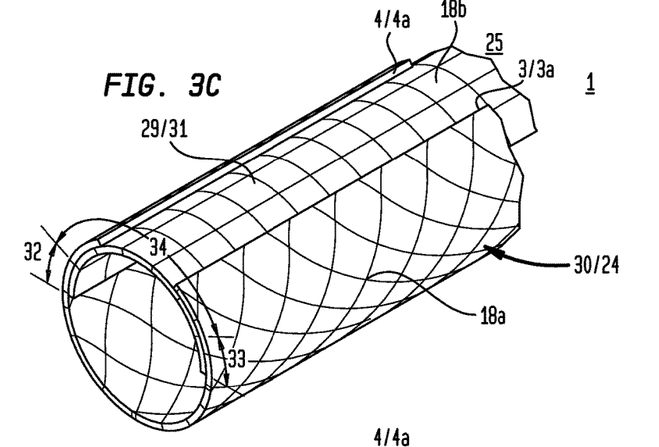
Figure 3D:
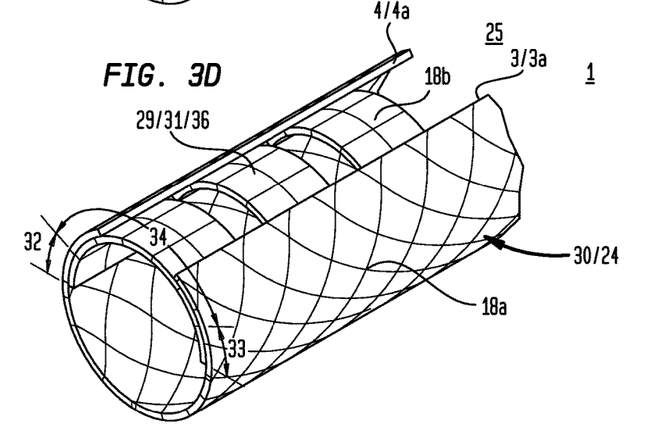
Figure 4A:
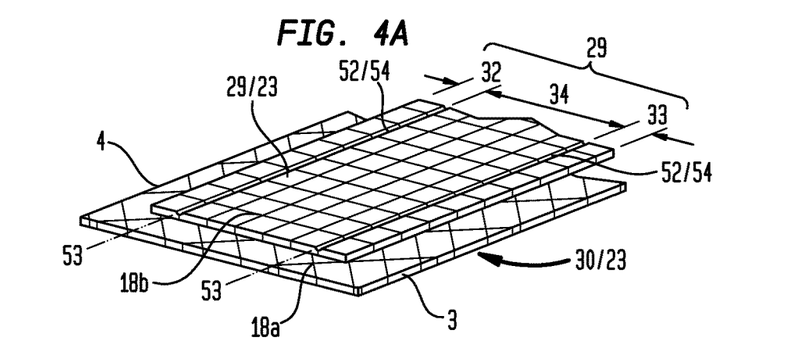
FIGS. 4A-4C illustrate a method of making another particular embodiment of the inventive laminate having one or more laminate structure stabilizers.

The one more stabilizers (29) can be produced from a flat sheet material such as metal or plastic flat sheet material, or can be laminate produced as above described, which can be disposed overlaying the laminate first face (27) of the laminate (30) in the flat condition (23) (as shown in the example of FIG. 3A). The stabilizer (29) can be disposed in fixed relation to the laminate (30) by securement portions (32)(33) secured to the laminate first face (27). The securement portions (32)(33) secured to the laminate first face (27) define an unsecured portion (34) of the stabilizer (29). The laminate (30) and the unsecured portion (34) of the stabilizer (29) can integrally operate between the flat condition (23) (as shown in the example of FIG. 3A) and the longitudinally slit tube (24) in which the stabilizer (29) has a radially opposed curvature to the longitudinal slit tube (24) (also referred to as the "arcuate condition (31)) (as shown in the examples of FIGS. 3B through 3D). The stabilizer (29) can act to increase the rigidity of the longitudinally slit tube (24), as above described. As to particular embodiments, the stabilizer (29) can have a structure which acts to bias configuration of the unsecured portion of the stabilizer (29) toward the arcute condition (31). As to particular embodiments, the stabilizer (29) in the form of a laminate can further include a second plurality of crossed fibers (18b) which can act to bias configuration of the unsecured portion of the stabilizer (29) toward the arcute condition (31).

As to particular embodiments, the securement portions (32)(33) of the stabilizer laminate (29) can be fixed to the laminate first face (27) of the laminate (30) during the lamination process by impregnating or applying an amount of adherent (14), as above described, to the respective laminable materials (5)(6) to produce the securement portions (32)(33) and the unsecured portion (34) of the stabilizer (29) as one piece with the laminate (30). However, as to other embodiments the securement portions (32)(33) can be secured by way of a bonding agent, ultrasonic welding, mechanical fasteners (such as rivets), or the like.

Now referring primarily to FIGS. 4A through 4C, 5A through 5C, and 6A through 6C, as to particular embodiments, a hinge element (52) can be disposed between the securement portions (32)(33) and the unsecured portion (34) of the stabilizer (29). The hinge element (52) can be provided in one or more of various constructional forms.

Figure 4B:
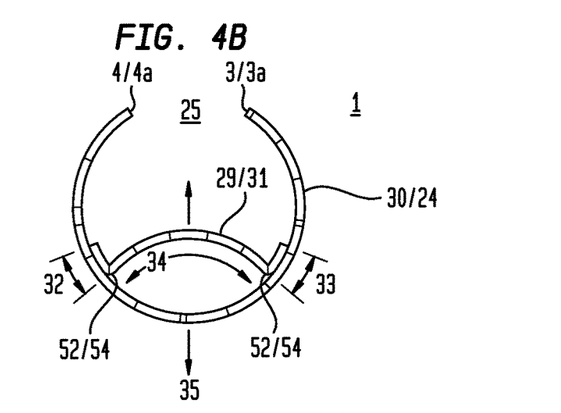
Figure 4C:
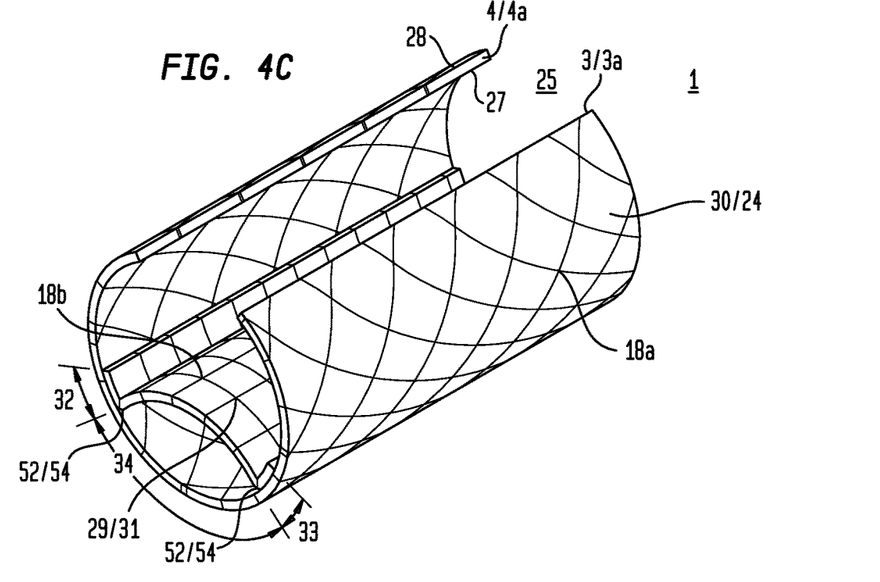

As to particular embodiments, the stabilizer (29) can have sufficient flexure about a hinge axis (53)(as shown in the example of FIG. 4A) to allow the first laminate (30) and the stabilizer laminate (29) to integrally operate between the flat condition (23) and the longitudinally slit tube (24) (as shown in the example of FIGS. 4A through 4C).

Figure 5A:
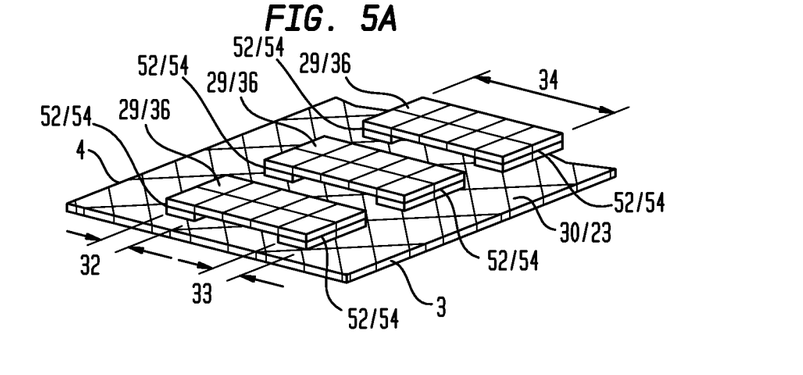
FIGS. 5A-5C illustrate a method of making another particular embodiment of the inventive laminate having one or more laminate structure stabilizers.
Figure 5B:
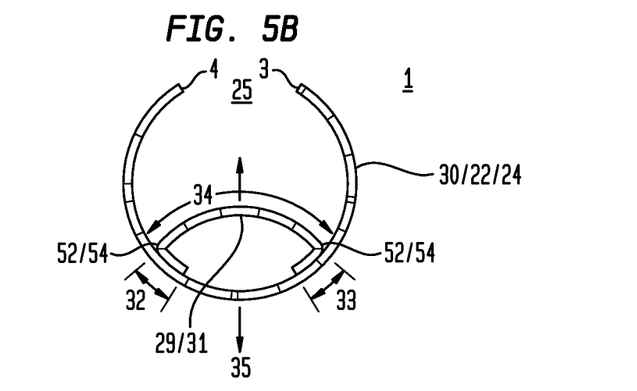
Figure 5C:
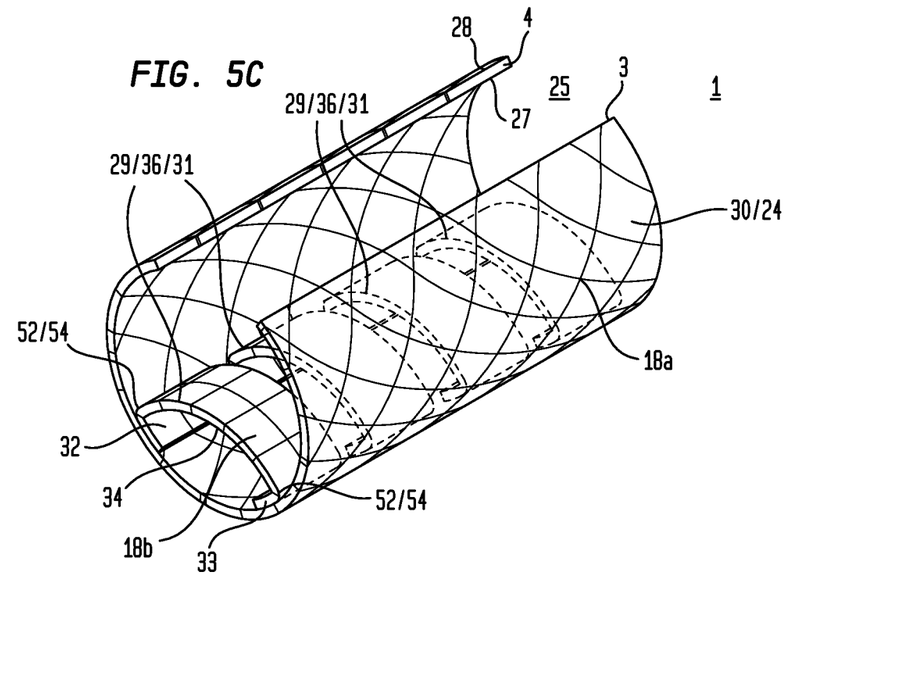

As to other embodiments, the stabilizer laminate (29) can have a portion formed as a thin flexible hinge (also referred to as a flexure bearing) (54) made from the same or similar material as the stabilizer laminate (29), or from a more flexible laminate or material other than the stabilizer laminate (29) such as an elastomer including, but not limited to, polyurethane, silicone rubber, or the like, or a plastic such as polyethylene or polypropylene or other fatigue resistant material, or combinations thereof (as shown in the example of 5A through 5C).

Figure 8A:
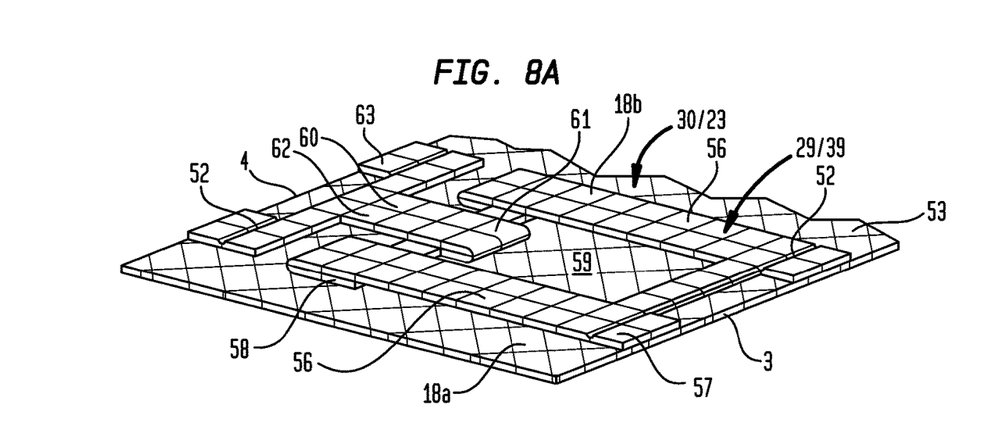
FIGS. 8A-8C illustrate a method of making another particular embodiment of the inventive laminate having one or more laminate structure stabilizers having offset radial relation.

As to particular embodiments, the thin flexible hinge (54) can allow the securement portions (32)(33) to foldably underlay the unsecured portion (34) (as shown in the example of FIG. 8A) or be disposed in adjacent relation to the unsecured portion (34) (as shown in the examples of FIGS. 5A through 5C and 8A through 8C).

Figure 6A:
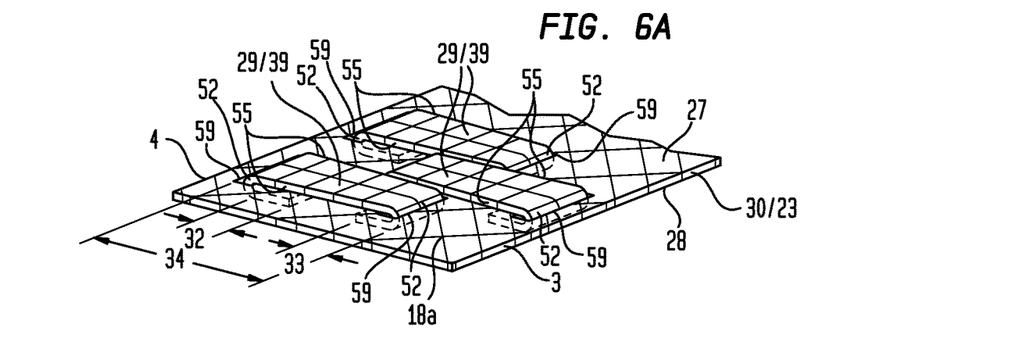
FIGS. 6A-6C illustrate a method of making another particular embodiment of the inventive laminate having one or more laminate structure stabilizers having offset radial relation.
Figure 6B:
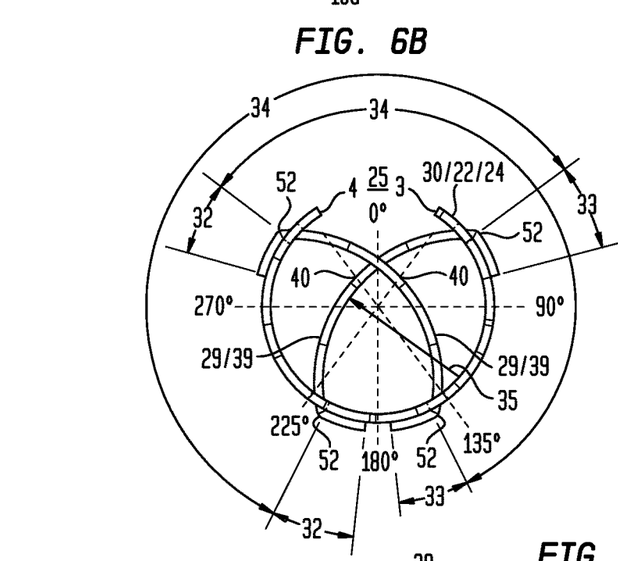
Figure 6C:
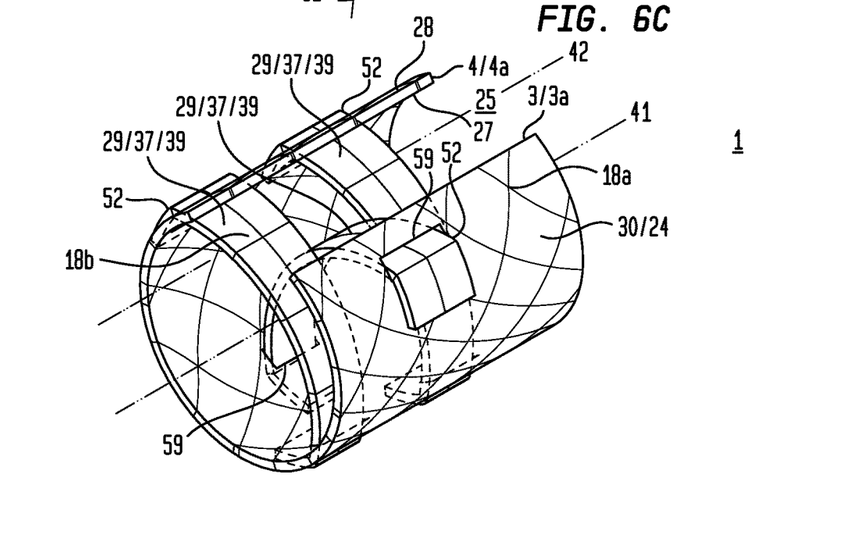

As to other embodiments, the laminate (30) can include a pair of bypass apertures (59) which communicate between the laminate first face (27) and the laminate second face (28) of the laminate (30). The pair of securement portions (32) (33) of the stabilizer (29) can pass through the pair of bypass apertures (55) to secure the pair of securement portions (32)(33) to the laminate second face (28) (as shown in the examples of 6A through 6C).

As to other embodiments, the hinge element (52) can be a mechanical hinge in which each of the pair of hinge elements rotate about a pivot element.

Now generally referring to FIGS. 3 through 9, the unsecured portion (34) of the stabilizer e (29) can integrally operate with the laminate (30) between a flat condition (23) (as shown in one or more of the examples of FIGS. 3A, 4A, 5A, 6A, 7A, 8A and 9A), which as to particular embodiments can be further configured as a stable roll or coil, toward an arcuate condition (31) as the first laminate (30) forms the longitudinally slit tube (24) (as shown in the examples of FIGS. 3B through 3D, 4B and 4C, 5B an 5C, 6B and 6C, 7B and 7C, 8B and 8C and 9B and 9C). The stabilizer laminate (29) in the arcuate condition (31) can have a radially opposed curvature (35) to the curvature of the longitudinal slit tube (24).

As shown in the example of FIGS. 3B through 3C, the opposed curvature (35) of the unsecured portion (34) of the stabilizer (29) can be disposed adjacent the longitudinal slit tube (24) spanning the longitudinal slit (25) to afford the laminate structure (1) greater axial, radial or torsional rigidity, greater resistance to deflection under load, or greater tensile strength, or combinations thereof. Now comparing FIGS. 3C and 3D, the stabilizer (29) can be configured as one stabilizer (29) (as shown in the example of FIG. 3C) or as a plurality of stabilizers (29) (as shown in the example of FIG. 3D) whether in spaced apart relation (36) (as shown in the example of FIG. 3D) or in adjacent relation (37) (as shown by the adjacent pairs in the example of FIG. 6C). The term "adjacent relation" means close to or being abutted as to some point or line.

Now referring primarily to FIGS. 4A through 4C and 5A through 5C, as to particular embodiments, the unsecured portion (34) of the stabilizer (29) can have a lesser dimension between securement portions (32)(33) than shown in the examples of FIGS. 3A through 3D. The stabilizer (29) in the arcuate condition (31) of the unsecured portion (34) can have an opposed curvature (35), as above described, which extends toward, but does not lie adjacent the first laminate (30) but spans the longitudinal slit (25) of the longitudinally slit tube (24). As to particular embodiments, the stabilizer (29) can be one continuous piece disposed along the entire length of the laminate (30) (as shown in the examples of FIGS. 4A and 4C); however, the invention is not so limited and the stabilizer (29), as above described, can be configured as a plurality of stabilizers (29) (as shown in the examples of FIGS. 5A through 5C) whether in spaced apart relation (36) or in adjacent relation (37). The stabilizer laminate (29) in the form shown in FIGS. 4A through 4C and FIGS. 5A through 5C act to generate in the longitudinally slit tube (24) greater axial, radial or torsional rigidity, greater resistance to deflection under load, or greater tensile strength, or combinations thereof.

Now referring primarily to FIGS. 6A through 6C and 7A through 7C, particular embodiments of the stabilizer (29) can be made as above described for the embodiments of FIGS. 5A through 5C to provide a plurality of stabilizers (29) whether in adjacent relation (37) or spaced apart relation (36) which can be further disposed in radial offset relation (39).

Figure 7A:
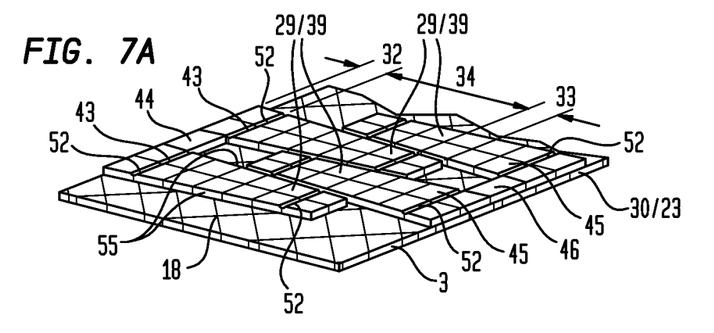
FIGS. 7A-7C illustrate a method of making another particular embodiment of the inventive laminate having one or more laminate structure stabilizers having offset radial relation.

As shown in the examples of FIGS. 6A and 7A, the plurality of stabilizers (29) can be secured to the laminate first face (27) of the laminate (30) in alternating lateral offset adjacent (37) or spaced apart relation (36) along the length of the laminate (30). The unsecured portion (34) of each of the plurality of stabilizers (29) in the arcute condition (31) having radially opposed curvature to the longitudinal slit tube (24) in alternating radially offset spaced apart (36) or adjacent (37) relation along the length of the longitudinally split tube (24) (or along portions of the length of the longitudinally split tube (24)).

Figure 7B:
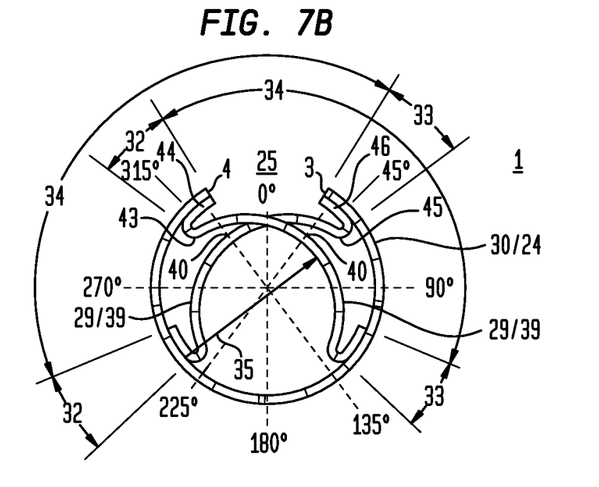

As shown in the examples of FIGS. 6B and 7B, each of the plurality of stabilizers (29) disposed in alternating radially offset relation (39) can have a midline (40) disposed in alternating relation at about 135 degrees ("°") and at about 225° respectively about the central longitudinal axis (41) of a longitudinal slit tube (24) where 0° occurs at the longitudinal midline (42) of the longitudinal slit (25). Understandably, the embodiments of FIGS. 6A through 6C and 7A through 7C are illustrative of the numerous embodiments of the invention which can be practiced by varying the location of the secured portions (32)(33) to correspondingly alter location of the unsecured portion (34), the degree location of the midline (40) of each of the plurality of stabilizer laminates (29) and the amount of radial offset between adjacent pairs in a plurality of stabilizer laminates (29), or the like.

Figure 7C:
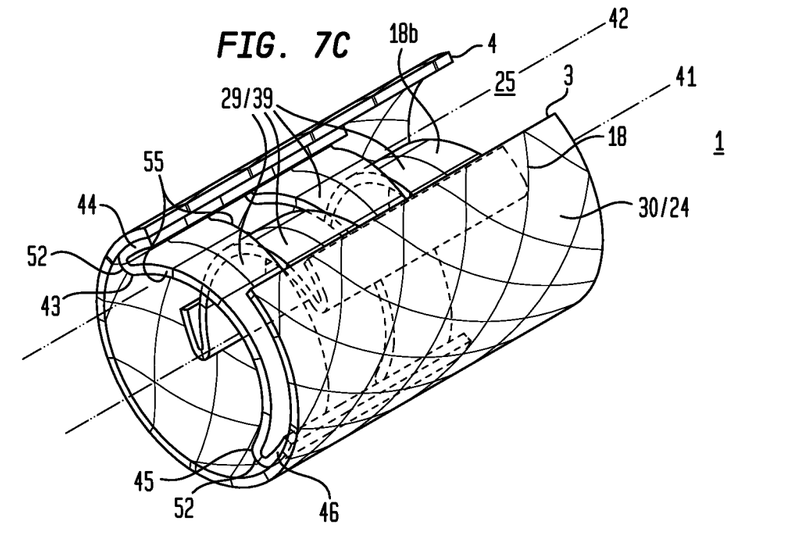

Again referring primarily to FIGS. 6C and 7C, the midline (40) between the securement portions (32)(33) of the plurality of stabilizers (29) in alternating radial offset relation (39) can be disposed such that curvature in adjacent pairs of the plurality of stabilizers (29) cross at a location above the longitudinal axis (41) of the longitudinal slit tube (24). As to particular embodiments, the location at which the curvature in adjacent pairs of the plurality of stabilizers (29) cross can be aligned with the longitudinal midline (42) of the longitudinal slit (24) of the slit tube (24).

Now referring primarily to FIGS. 6A through 6C and 7A through 7C, as to particular embodiments, the plurality of stabilizers (29) can be disposed in adjacent relation (37), each of the plurality of stabilizer laminates (29) having a pair of sides (55) which taper inwardly between the first securement portion (32) and the second securement portion (33). The securement portions of lesser width can be disposed in opposed alternating adjacent relation (37) to the securement portion of greater width (as shown in the examples of FIGS. 6A and 7A). The pair of sides (55) having tapered inward relation afford the advantage of allowing more numerous stabilizers (29) to be disposed in adjacent relation (37) along the length of the laminate (30) in the substantially flat condition (23) while having reduced or avoiding sliding engagement of the pairs of sides (55) as the plurality of stabilizers (29) move from the substantially flat condition (23) toward the structure of a longitudinally slit tube (24)

Now referring primarily to FIGS. 7A through 7C, embodiments having a plurality of stabilizers (29) can further provide a one-piece common securement portion (44) to which a plurality of stabilizer ends (43) terminate proximate the same radial degree location of the longitudinal split tube (24). As shown in the example of FIG. 8B, each of the plurality of stabilizer ends (43) terminating proximate 315° can be interconnected by a first common securement portion (44) and each of the plurality of stabilizer ends (45) terminating at proximate 45° can be interconnected by a second common securement portion (46).

Figure 8B:
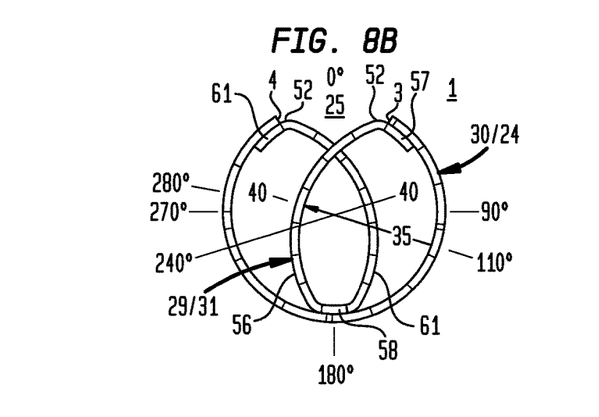
Figure 8C:
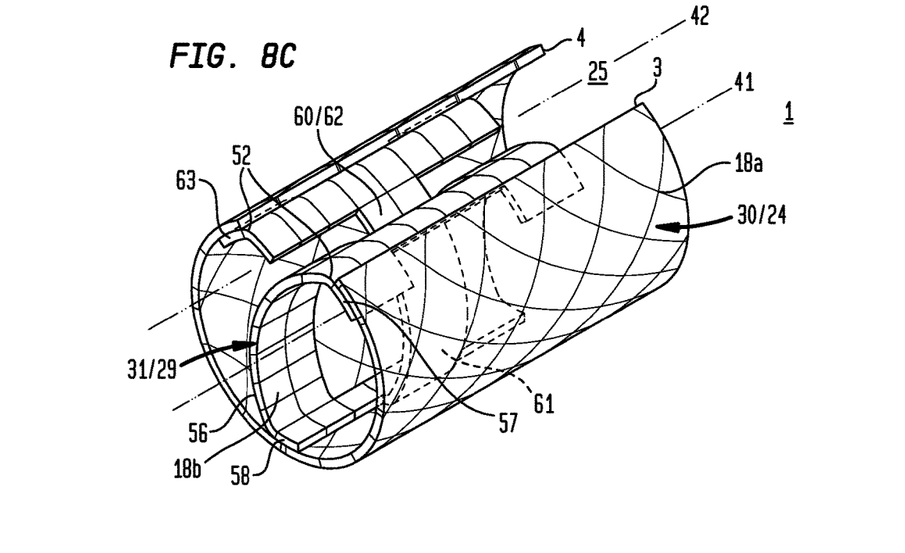

Now referring primarily to FIGS. 8A through 8C, particular embodiments of the plurality of stabilizers (29) can be provided as one-piece in which a first common securement element (57) and second common securement element (58) secure to the laminate first face (27) of the laminate (30) to provide a first plurality of stabilizers (56) disposed in adjacent spaced apart relation which correspondingly define a plurality of stabilizer pass throughs (59). A second plurality of stabilizers (60) can have a stabilizer first end (61) connected to the second common securement element (58). Each stabilizer second end (62) of the second plurality of stabilizers (60) can be passed through a corresponding one of the plurality of stabilizer pass throughs (59) to overlay the second common securement element (58). Each stabilizer second end (62) can be secured to the laminate first face (27) of the laminate (30) at a third common securement element (63) to provide a flat condition (23) of the laminate (30)(as shown in the example of FIG. 8A) which can be further disposed in a roll or a coil. The flat condition (23) can form, or be extended from the roll or coil to form, the longitudinally split tube (24), as shown in the example of FIG. 8C. As shown in FIG. 8B and as described above, the midline (40) of the first plurality of stabilizers (56) and the midline (40) of the second plurality of stabilizers (60) can occur in offset radial relation (39) such that curvature of adjacent pairs of the plurality of stabilizers (29) cross at a location above the longitudinal axis of slit tube (41) and as to particular embodiments can cross at a location aligned with the longitudinal midline (42) of the longitudinal slit (24) of the slit tube (24).

Figure 9A:
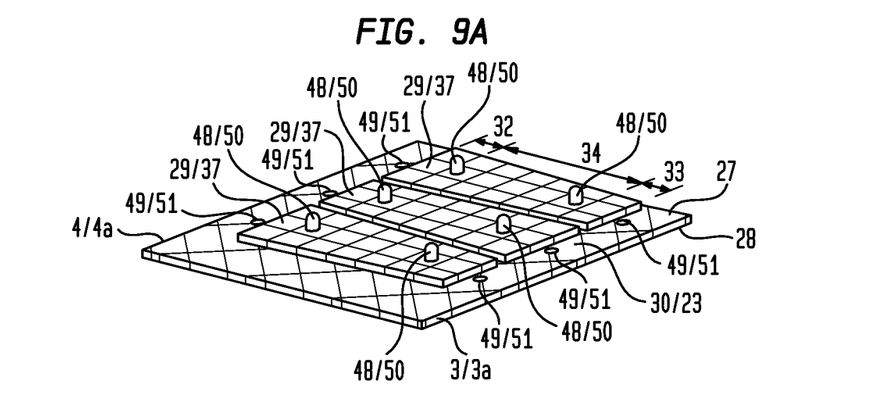
FIG. 9A-9C illustrate a method of making another particular embodiment of the inventive laminate having one or more laminate structure stabilizers which further includes a lock element.
Figure 9B:
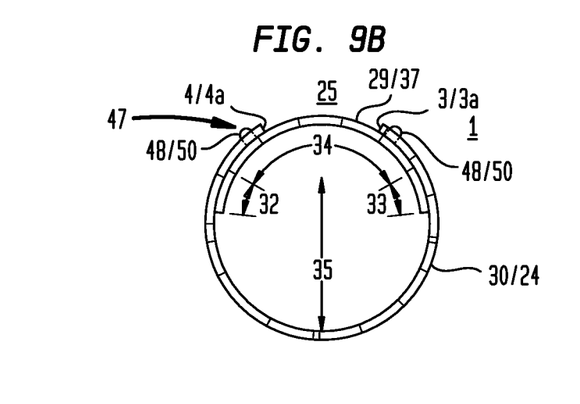
Figure 9C:
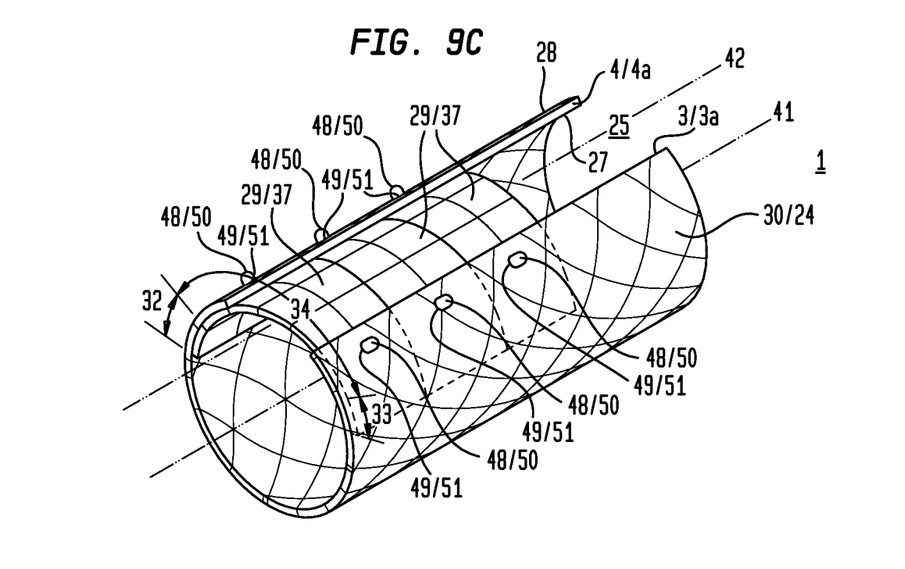

Now referring primarily to FIGS. 9A through 9C, the stabilizers (29) can further include one or more lock elements (47) which operate to dispose in secured fixed relation the opposed laminate edges (3)(4) or (3a)(4a)) of the longitudinal split tube (24). The illustrative example of FIGS. 9A through 9C can be produced as above-described for the examples of FIGS. 3A through 3D and further includes a lock element first portion (48) coupled to the stabilizer laminate (29) and further includes a lock element second portion (49) coupled proximate one of the opposed laminate edges (3)(4) of the first laminate (30) in the flat condition (20) (as shown in the example of FIG. 9A). The lock element first portion (48) and the lock element second portion (49) mateably couple upon formation of the longitudinal split tube (24) (as shown in the example of FIGS. 9B and 9C).

In the illustrative example of FIGS. 9A through 9C, the lock element first portion (48) takes the form of a cylindrical pin (50) coupled to the unsecured portion (34) of the stabilizer laminate (29). The cylindrical pin (50) projects outwardly from the surface of the stabilizer laminate (29) and the lock element second portion (49) takes the form of a corresponding lock apertures (51) which communicates between a first laminate face (27) and a second laminate face (28) of the first laminate (30). The lock element first portion (48) (cylindrical pin (50)) and the lock element second portion (49) (lock apertures (51)) can be respectively located to allow each cylindrical pin (50) to pass through the corresponding lock aperture (51) as the first laminate achieves the longitudinal slit tube (24) to dispose the laminate edges (3)(4) of the first laminate (30) in fixed relationship (as shown in the example of FIG. 9C).

As can be easily understood from the foregoing, the basic concepts of the present invention may be embodied in a variety of ways. The invention involves numerous and varied embodiments of a laminate and methods of producing a laminate.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of "laminate" should be understood to encompass disclosure of the act of "laminating"—whether explicitly discussed or not—and, conversely, were there effectively disclosure of the act of "laminating", such a disclosure should be understood to encompass disclosure of "a laminate" and even a "means for laminating." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

Moreover, for the purposes of the present invention, the term "a" or "an" entity refers to one or more of that entity; for example, "a layer of laminable material" refers to one or more layers of laminable material. As such, the terms "a" or "an", "one or more" and "at least one" can be used interchangeably herein. Furthermore, an element "selected from the group consisting of" refers to one or more of the elements in the list that follows, including combinations of two or more of the elements.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Thus, the applicant(s) should be understood to claim at least: i) each of the laminates herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

We claim:

1. A laminate, comprising:
   a laminate having a first edge and a second edge, said laminate having a structure which acts to bias configuration of said laminate from a substantially flat condition toward a longitudinally slit tube having said first edge disposed in opposed relation to said second edge defining a longitudinal slit; and
   a stabilizer having an unsecured portion disposed between a pair of securement portions, said securement portions secured to a first face of said laminate to dispose said stabilizer in overlaying fixed relation to said laminate, said laminate in said substantially flat condition disposes said unsecured portion in a corresponding substantially flat condition, said laminate configured as said longitudinally slit tube disposes said unsecured portion of said stabilizer in an arcuate condition inside of said longitudinally slit tube, said arcuate condition having a radially opposed curvature to said longitudinal slit tube.

2. The laminate of claim 1, wherein said stabilizer comprises a plurality of stabilizers each having an unsecured portion disposed between a pair of securement portions secured to said first face to dispose said plurality of stabilizers in fixed spaced apart relation along the length of said laminate, said plurality of stabilizers in said arcuate condition each having radially opposed curvature to said longitudinal slit tube.

3. The laminate of claim 2, wherein said unsecured portion of each of said plurality of stabilizers lie adjacent said longitudinal slit tube spanning said longitudinal slit.

4. The laminate of claim 3, wherein said plurality of stabilizers secure to said first face in alternating lateral offset spaced apart relation along the length of said laminate, each of said plurality of stabilizer laminates in said arcuate condition having radially opposed curvature to said longitudinal slit tube, said plurality of stabilizers in said arcuate condition having alternating radially offset spaced apart relation along the length of said longitudinally split tube.

5. The laminate of claim 4, wherein adjacent pairs of said plurality of stabilizers in radially offset relation cross at a location between said longitudinal axis of said longitudinal slit tube and said slit of said longitudinal slit tube.

6. The laminate of claim 5, wherein said plurality of stabilizers have a pair of sides which taper inwardly between a first securement portion and the second securement portion, said second securement portion of lesser width disposed in opposed alternating adjacent relation to said first securement portion of greater width.

7. The laminate of claim 6, further comprising a pair of bypass apertures which communicate between said first face and a second face of said laminate, said pair of securement portions of said stabilizer correspondingly passing through said pair of bypass apertures to secure to said second face of said laminate.

8. A laminate, comprising:
   a laminate having a first edge and a second edge, said laminate having a structure which acts to bias configuration of said laminate from a substantially flat condition toward a longitudinally slit tube having said first edge disposed in opposed relation to said second edge defining a longitudinal slit;
   a pair of bypass apertures which communicate between said first face and a second face of said laminate; and
   a stabilizer having an unsecured portion disposed between a pair of securement portions, said pair of securement portions of said stabilizer correspondingly passing through said pair of bypass apertures to secure to said second face of said laminate to dispose said stabilizer in overlaying fixed relation to said first face of said laminate, said laminate configured as said longitudinally slit tube disposes said unsecured portion of said stabilizer in an arcuate condition inside of said longitudinally slit tube, said arcuate condition having a radial curvature opposing said longitudinal slit tube.

* * * * *